United States Patent Office 2,802,025
Patented Aug. 6, 1957

2,802,025

PROCESS FOR THE PRODUCTION OF LOWER CARBOXYLIC PERACIDS

Gerhard Weitbrecht, Neu-Isenburg, and Josef Müller, Rheinfelden, Baden, Germany, assignors to Deutsche Gold- und Silber-Scheideanstalt vormals Roessler, Frankfurt am Main, Germany No Drawing. Application October 26, 1953, Serial No. 388,452

Claims priority, application Germany November 12, 1952

14 Claims. (Cl. 260—502)

The present invention relates to an improved process for the recovery of lower aliphatic percarboxylic acids, and especially peracetic acid in high concentrations by distillation under reduced pressure in the presence of water binding inorganic materials.

Previously in the production of percarboxylic acids, especially peracetic acid, which in general are produced from hydrogen peroxide and the corresponding carboxylic acid, it was usually necessary to employ the starting materials in very concentrated form as it was not possible to concentrate the percarboxylic acids obtained in the equilibrium reaction by vacuum distillation of their dilute aqueous solutions. For example, it is not possible to attain any noteworthy concentration increase of peracetic acid in the distillate obtained by vacuum distillation of a 25% aqueous peracetic acid solution.

Also, upon vacuum distillation of reaction mixtures obtained by reacting carboxylic acids with 30% hydrogen peroxide, a percarboxylic acid distillate of a concentration of only 20 to 30% is obtained, which distillate, furthermore, is unstable in the presence of such large quantities of water, as it rapidly decomposes hydrolytically.

It is an object of the invention to provide a process whereby dilute aqueous percarboxylic acid solutions can be concentrated by vacuum distillation to produce highly concentrated percarboxylic acids of, for example, concentrations of 50% and more.

It was unexpectedly found according to the invention that dilute solutions of percarboxylic acids could be concentrated to high concentrations successfully without loss of active oxygen by distillation when such distillation is carried out in the presence of inorganic water binding substances or mixtures of inoraganic water binding substances.

The water binding substances employed according to the invention in general are all those water binding substances which are capable of forming stabile hydrates at temperatures up to 60° C. and do not have any decomposing action upon the percarboxylic acids or hydrogen peroxide. Magnesium perchlorate, for example, can be employed as a water binding substance according to the invention. Acid or acid reacting water binding substances have been found particularly suitable for the process according to the invention, especially, phosphoric acid, sulfuric acid, selenic acid, and phosphorus pentoxide. Especially good results can be achieved with sulfuric acid.

The quantity of the water binding substance or substances employed according to the invention depends upon the water content of the mixture to be distilled and generally amounts to 100% to 250% of such water content. In accordance with an especially advantageous modification of the process according to the invention the quantity of water binding substance is 150% to 200% of the quantity of water present in the mixture to be distilled.

The process according to the invention is not only applicable to ordinary solutions of percarboxylic acids in water but also to mixtures which in addition to water also contain the corresponding carboxylic acids and hydrogen peroxide. It is already known that in such mixtures to which in general small, to a certain degree, catalytic amounts of strong acids such as sulfuric acid have been added to initiate the reaction, percarboxylic acids are formed in greater or lesser concentrations, depending upon the equilibrium conditions. The distillation of such reaction mixtures to recover the percarboxylic acids formed, however, as mentioned above, only lead to percarboxylic acid concentrations in the distillate of from 20% to a maximum of 30%.

The addition of dehydrating agents, especially sulfuric acid, in greater than catalytic quantities, not only renders it possible to obtain distillates containing percarboxylic acids in concentrations above 50%, for example, between 60 and 70%, but also displaces the equilibrium of the reaction in favor of the production of the desired percarboxylic acids. For example, upon reacting dilute hydrogen peroxide with glacial acetic acid in the presence of 1% of sulfuric acid (with reference to the total reaction mixture), the reaction equilibrium reached after 12 to 16 hours is such that about 20 to 25% peracetic acid is formed. On the other hand, if over catalytic amounts of water binding substances such as sulfuric acid are employed in accordance with the invention, an increased conversion of the active oxygen into peracetic acid is obtained, which can then be recovered by distillation of the reaction mixture under vacuum in a concentration of 60 to 70%.

Unexpectedly, the large quantities of sulfuric acid employed according to the invention, do not cause any noteworthy losses by decomposition of peracetic acid nor do they lead to the production of diacetyl substituted hydrogen peroxide which because of its instability can even at low concentrations give rise to explosions.

It has been found advantageous to employ a 40 to 70% excess of carboxylic acid with reference to the hydrogen peroxide employed in the production of peracids when such reaction is carried out with dilute hydrogen peroxide, for example, 35% hydrogen peroxide in the production of reaction mixtures suitable for distillation according to the invention.

The process according to the invention is not limited to the distillation of liquid reaction mixtures obtained from dilute hydrogen peroxide and carboxylic acids. It is also possible, according to another modification of the process according to the invention, to react vaporized mixtures of hydrogen peroxide, water and a carboxylic acid in a suitable apparatus, for example, a trickle tower, at the temperature of the distillation in intimate contact with concentrated sulfuric acid preferably in finely divided form in order to effect simultaneous production and distillation of the peracids.

The process according to the invention can also be employed to work up the residue liquors obtained in the production of hydrogen peroxide from persulfates or persulfuric acid by subjecting such liquors to distillation in admixture with a carboxylic acid such as acetic acid and thereby utilize the dehydrating action of the sulfuric acid in such liquors for the purposes of the invention.

It was found, that a minimum water content in the distillates obtained in accordance with the invention is of extreme importance for the stability of the concentrated percarboxylic acids obtained. It was therefore found advantageous, to condense the distillate going over with the corresponding carboxylic acid in concentrated form or in the form of its anhydride. For example, in the distillation of peracetic acid, the distilling vapors can be washed out by spraying in glacial acetic acid or acetic acid anhydride under cooling, the quantities thereof being adjusted so that the peracetic acid is obtained directly in the desired concentration, for example, 40%.

The process according to the invention is generally applicable for the recovery of the lower aliphatic percarboxylic acids, such as, for example, peracetic acid, perpropionic acid and perbutyric acid in high concentrations whether merely the distillation of ordinary aqueous solutions of such acids is concerned or whether mixtures are distilled which contain besides, water and a percarboxylic acid, hydrogen peroxide and the corresponding carboxylic acid. Especially good results are obtained in accordance with the invention in the distillation of peracetic acid from its dilute aqueous solutions or mixtures to obtain distillates containing 60 to 70% of peracetic acid. Such distillation of peracetic acid can be carried out at temperatures between 30 and 70° C., preferably between 40 and 55° C. at pressures between 10 and 15 mm./Hg.

The following examples serve to illustrate the process according to the invention.

*Example 1*

100 grams of a 25% aqueous solution of peracetic acid were mixed with about 150 grams of concentrated sulfuric acid and the mixture was distilled at a temperature of 40 to 50° C. at a reduced pressure of 11 mm. Hg, whereby a distillate of peracetic acid of about 60% was obtained. If, on the other hand, a 25% aqueous solution of peracetic acid not containing the sulfuric acid addition was distilled, practically no increase in the concentration of the peracetic acid was observed in the distillate.

*Example 2*

A mixture obtained by reacting 204 grams (3.4 mol) of acetic acid with 200 grams (2. mol) of 34% hydrogen peroxide in the presence of 420 grams of sulfuric acid ($D=1.84$) at temperatures which did not exceed 40° C. during the reaction was vacuum distilled at a temperature between 30 and 50° C. at a pressure of 11 mm. Hg. The distillate obtained was a 70% solution of peracetic acid in acetic acid.

*Example 3*

A mixture of 287 grams of acetic acid (71%), 151 grams of hydrogen peroxide (45%) and 488 grams of metaphosphoric acid (100%) was distilled at a temperature between 40 and 50° C. at a pressure of 11 mm. Hg. The distillate obtained amounted to 200 grams and was a 60% solution of peracetic acid.

*Example 4*

A mixture of 255 grams of acetic acid (80%) and 226 grams of hydrogen peroxide (30%) were distilled in the presence of 300 grams of water-free magnesium perchlorate at a temperature between 40 and 50° C. and a pressure of 11 mm. Hg. 250 grams of 40% peracetic acid were obtained as the distillate.

*Example 5*

252 grams of 100% propionic acid, 200 grams of 34% hydrogen peroxide were mixed with 420 grams of sulfuric acid ($D=1.84$) and the mixture distilled at 11 mm. Hg at 50° C. The distillate obtained was 62% perpropionic acid.

*Example 6*

333 grams of 90% butyric acid and 170 grams of 40% hydrogen peroxide were reacted in the presence of 420 grams of sulfuric acid ($D=1.84$) and the reaction mixture was distilled at 11 mm. Hg at a temperature of 50–55° C. The distillate was a 55% perbutyric acid solution with a yield amounting to 83% with reference to the active oxygen.

*Example 7*

3200 grams of residue liquor ($D=1.60$) from the production of hydrogen peroxide still containing 18 grams of active oxygen (calculated on hydrogen peroxide) were mixed with 127 grams of acetic acid (100%) and at a temperature of 80 to 120° C. of the liquid and at a temperature of 60 to 80° C. of the vapor distilled at a pressure of 50 mm. Hg. The resulting distillate contained 6.0% of peracetic acid corresponding to a yield of 75% of the otherwise nearly unworkable residue liquor. The yield is 90% of peracetic acid plus hydrogen peroxide calculated on the total amount of oxygen.

By a redistillation of the distillate with fresh residue liquor or by a reaction process in a column with finely divided hot residue liquor in the vapor phase, the concentration of peracetic acid is gradually increased whereby the oxygen rest is further utilized.

We claim:

1. In a process for the recovery of a lower aliphatic percarboxylic acid by vacuum distillation of its dilute admixtures with water containing up to about 30% of lower aliphatic percarboxylic acid, the step which comprises carrying out the distillation of such aqueous admixture in the presence of a water binding agent in a quantity which is at least 100% of the quantity of water present in such admixture.

2. The process of claim 1 in which the quantity of water binding agent is 100 to 250% of the quantity of water present in such admixture.

3. The process of claim 1 in which the quantity of water binding agent is 150 to 200% of the quantity of water present in such admixture.

4. In a process for the recovery of a lower aliphatic percarboxylic acid by vacuum distillation of its dilute admixtures with water containing up to about 30% of lower aliphatic percarboxylic acid, the step which comprises carrying out the distillation of such aqueous admixture in the presence of an acidic water binding agent in a quantity which is at least 100% of the quantity of water present in such admixture.

5. In a process for the recovery of a lower aliphatic percarboxylic acid by vacuum distillation of its dilute admixtures with water containing up to about 30% of lower aliphatic percarboxylic acid, the step which comprises carrying out the distillation of such aqueous admixture in the presence of sulfuric acid in a quantity which is at least 100% of the quantity of water present in such admixture.

6. A process for the recovery of a lower aliphatic percarboxylic acid which comprises vacuum distilling a mixture of dilute aqueous hydrogen peroxide containing up to about 45% hydrogen peroxide and a lower aliphatic carboxylic acid in a quantity 40 to 70% in excess of that required to react with the hydrogen peroxide to form the corresponding percarboxylic acid in the presence of a water binding agent in a quantity which is at least 100% of the quantity of water present in such admixture.

7. A process for the recovery of a lower aliphatic percarboxylic acid which comprises vacuum distilling a mixture of dilute aqueous hydrogen peroxide containing up to about 45% hydrogen peroxide and a lower aliphatic carboxylic acid in a quantity 40 to 70% in excess of that required to react with the hydrogen peroxide to form the corresponding percarboxylic acid in the presence of concentrated sulfuric acid in a quantity which is 100% to 250% of the water contained in such mixture.

8. A process for the production of a lower aliphatic percarboxylic acid which comprises reacting a vapor phase mixture of dilute aqueous hydrogen peroxide containing up to about 45% hydrogen peroxide and a lower aliphatic carboxylic acid in intimate contact with finely divided sulfuric acid in a quantity which is at least 100% of the quantity of water present in such mixture at distillation temperatures.

9. A process for the recovery of a lower aliphatic percarboxylic acid which comprises vacuum distilling a mixture of a lower aliphatic carboxylic acid with the sulfuric acid containing residual liquors obtained in the production of hydrogen peroxide from persulfates.

10. A process for the recovery of a lower aliphatic percarboxylic acid which comprises vacuum distilling a mixture of a lower aliphatic carboxylic acid with the sulfuric acid containing residual liquors obtained in the production of hydrogen peroxide from persulfuric acid.

11. A process for the production of peracetic acid which comprises distilling a mixture of acetic acid, dilute aqueous hydrogen peroxide containing up to about 45% hydrogen peroxide and sulfuric acid in a quantity which is at least 100% of the quantity of water present in the mixture at a temperature between 30 and 70° C. and a pressure between 10 and 15 mm. Hg.

12. A process for the production of peracetic acid which comprises distilling a mixture of acetic acid, dilute aqueous hydrogen peroxide containing up to about 45% hydrogen peroxide and sulfuric acid in a quantity which is at least 100% of the quantity of water present in the mixture at a temperature between 40 and 50° C. and a pressure between 10 and 15 mm. Hg.

13. A process for the recovery of peracetic acid which comprises vacuum distilling a dilute aqueous solution of peracetic acid containing up to about 30% of peracetic acid in the presence of a water binding agent in a quantity which is at least 100% of the quantity of water present in the mixture and contacting the resulting vaporized distillate with concentrated acetic acid to condense such distillate.

14. A process for the recovery of peracetic acid which comprises vacuum distilling a dilute aqueous solution of peracetic acid containing up to about 30% of peracetic acid in the presence of a water binding agent in a quantity which is at least 100% of the quantity of water present in the mixture and contacting the resulting vaporized distillate with concentrated acetic acid anhydride to condense such distillate.

References Cited in the file of this patent

UNITED STATES PATENTS

| | | |
|---|---|---|
| 1,863,698 | Schulze | June 21, 1932 |
| 2,490,800 | Greenspan | Dec. 13, 1949 |
| 2,604,440 | Brooks et al. | July 22, 1952 |

OTHER REFERENCES

D'Ans et al.: Berichte, vol. 48, pg. 1137 (1915).

Swern: Chem. Reviews 45 (1949), "Organic Peracids," pgs. 1 and 4 thru 8.